United States Patent [19]

Arvanitakis

[11] 4,001,115
[45] Jan. 4, 1977

[54] FILTRATION SYSTEM WITH STORAGE AND DILUTION RESERVOIRS

[76] Inventor: Kostas Savas Arvanitakis, 14945 S. Dogwood Ave., Orland Park, Ill. 60462

[22] Filed: June 21, 1974

[21] Appl. No.: 481,528

[52] U.S. Cl. .............................. 210/67; 210/73 R; 210/196

[51] Int. Cl.² ........................................ B01D 37/04

[58] Field of Search ............ 210/73, 124, 125, 128, 210/129, 196, 67, 71

[56] References Cited

UNITED STATES PATENTS

| | | | |
|---|---|---|---|
| 3,410,795 | 11/1968 | Blytas et al. | 210/73 X |
| 3,563,382 | 2/1971 | Regent | 210/124 X |
| 3,638,793 | 2/1972 | Peck | 210/196 X |
| 3,679,053 | 7/1972 | Koulovatos et al. | 210/124 X |
| 3,705,648 | 12/1972 | Arvanitakis | 210/73 X |
| 3,820,658 | 6/1974 | Cruze | 210/196 X |

*Primary Examiner*—Thomas G. Wyse
*Attorney, Agent, or Firm*—August E. Roehrig, Jr.

[57] ABSTRACT

A method of clarifying contaminated liquid through the use of a storage reservoir for containing high volume surges of contaminated influent and chemically treating the influent passed thereinto and a dilution reservoir for selectively transferring the contents of the storage reservoir thereinto to more uniformly control the solids content of the influent to be transferred to the filtration system. The filtration system includes a primary and secondary filter which clarify the contaminated liquid.

8 Claims, 9 Drawing Figures

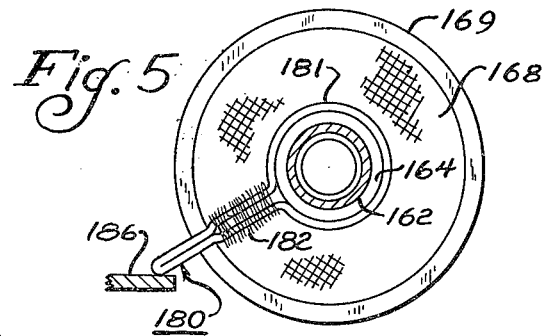
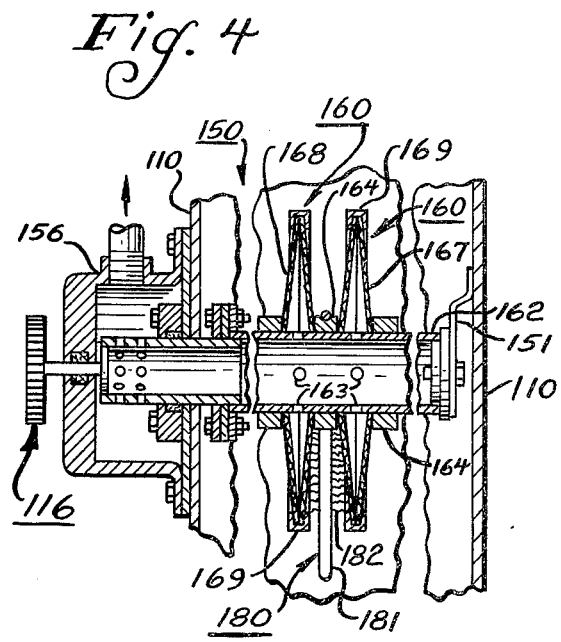
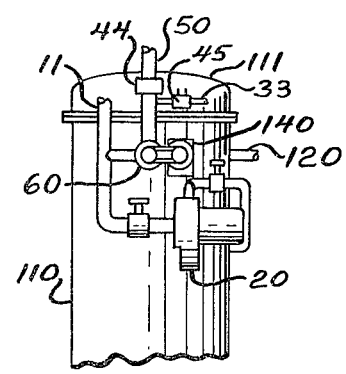
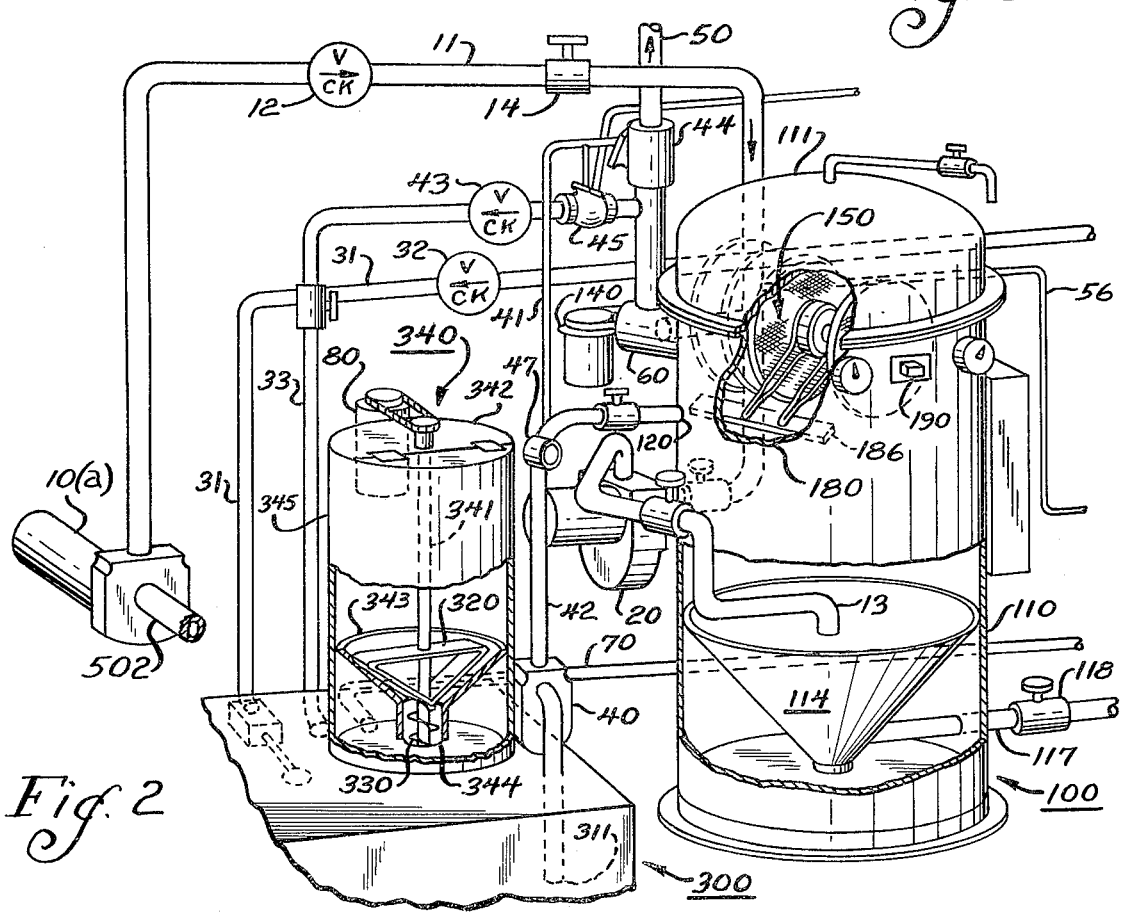

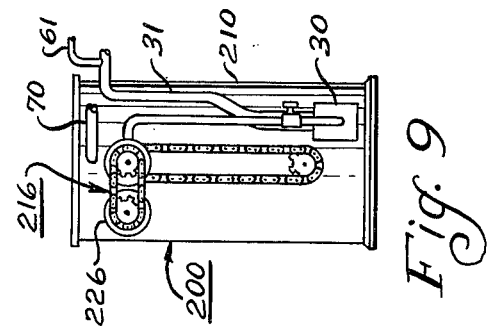
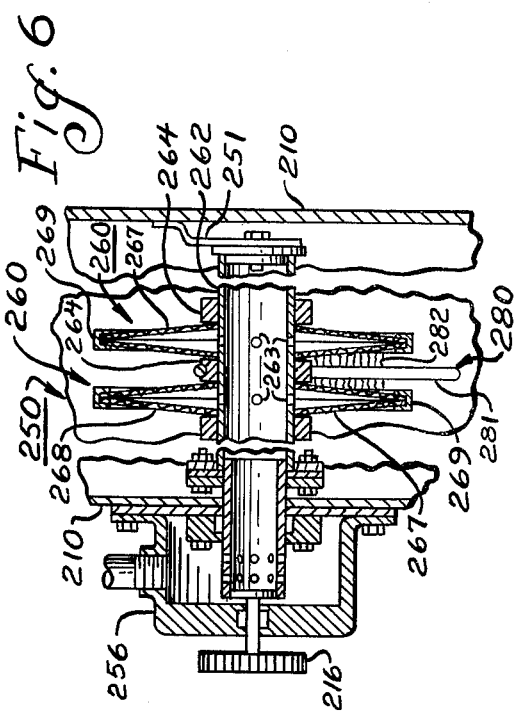
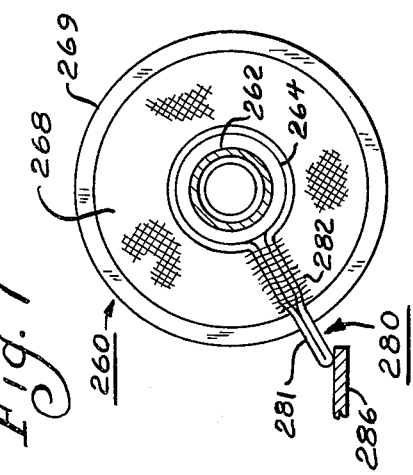
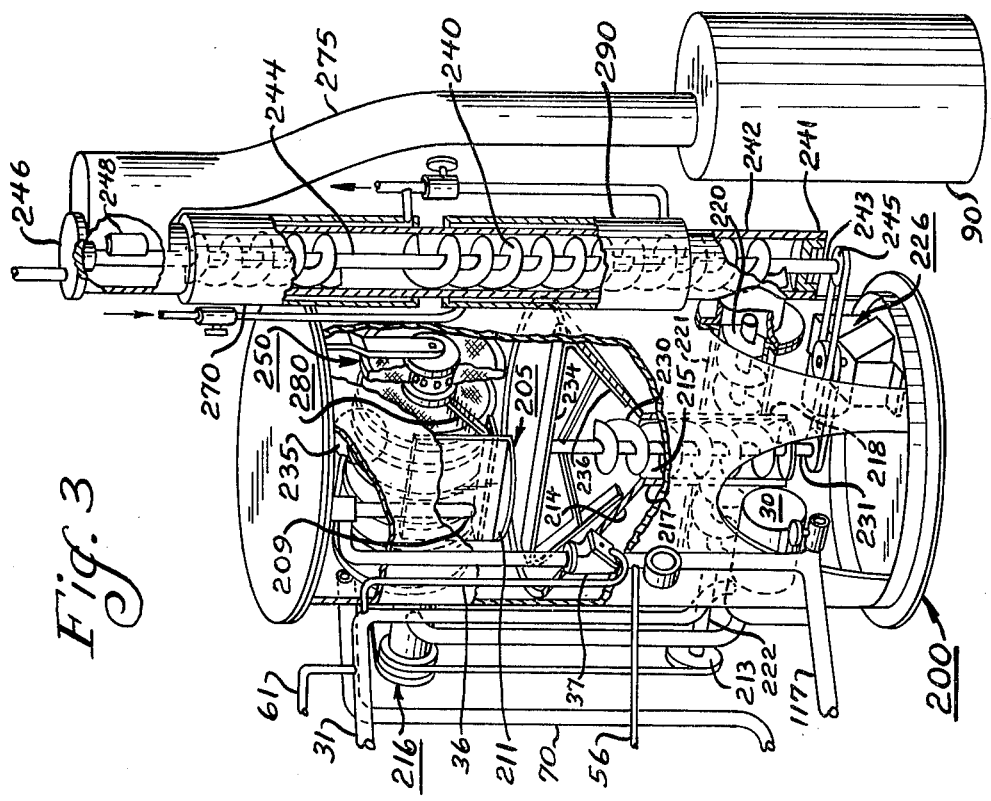

FILTRATION SYSTEM WITH STORAGE AND DILUTION RESERVOIRS

BACKGROUND OF THE INVENTION

This invention relates to a method of clarifying liquids and, in particular, to a filtration system for unattended clarification of varying influent loads.

More specifically, this invention relates to a filtration system utilizing primary and secondary filters with storage and dilution reservoirs to provide a constant quality effluent from an influent which varies both in quantity of discharge and percentage of solids concentration.

Filtration systems are used in many applications wherein it is desired to clarify liquids by removing solids and chemical contaminants prior to discharging the liquid, for example, into sewers. Certain types of applications require that a liquid be clarified by the filtration system in order that it be continuously reused without discharge into sewage lines or subjected to a costly method of ultimate disposal. In these applications, referred to as closed loop systems, the liquid must be reclaimed either due to environmental pollution control or cost constraints. Such a closed loop filtration system is utilized in many applications wherein the cost of the liquid clarified in such that it would be uneconomical to dispose of the liquid, or the liquid is of such a nature that the final disposal costs require that the liquid be utilized for many cycles prior to being expended.

In certain other types of applications wherein the liquid is discharged for disposal such as into sewage lines, referred to as an open loop system, it is necessary for environmental pollution control that certain materials conveyed or suspended in the liquid be removed therefrom prior to discharge. The contaminants or suspended materials removed from the liquid must be collected for disposal in the most economical manner.

In either an open loop system or a closed loop system, the influent may vary both as to the quantity being discharged to the filtration system and/or the percentage of solids contained in the influent. If such a varying influent is coupled directly to the filtration system, the system must be continually monitored by an operator to handle the varying loads of influent and must be designed such that the maximum load can be passed through the filtration system. Since the quantity of influent is variable such a filtration system would be overdesigned and, therefore, would not be operating at its maximum efficiency except during peak loading periods.

In an attempt to eliminate this problem, storage reservoirs have been used in connection with such filtration systems so that the surges of high volume liquid can be stored within the reservoir or holding tanks to provide a more constant quantity of influent through the filtration system. However, such systems are only capable of passing the influent through the filtration system in a single cycle resulting in inconsistent uniformity of the discharged filtrate due to variable solids concentrate in the influent. The varying solids concentration frequently results in unclarified liquid bleeding through the filter elements.

Another problem associated with these prior art systems is that the heavy solids concentration in the influent to the filtration system causes the filter elements to blind or clog. The blinding or clogging of the filter element precoat results in a shortened filtration cycle and necessitates frequent replacement of the filter cake or precoat formed on the filter elements. The frequent replacement of the expended filter cake results in increased material costs, e.g., the filter cake forming medium, and causes increased unit cost due to the necessity for larger filter area and the spacing required thereby in order to handle the maximum concentration of solids in the influent.

Since none of these problems have heretofore been satisfactorily solved through the use of a pressure precoat type filter, the only somewhat satisfactory system for handling variable influent has been a rotary vacuum filter. Whenever the concentration of solids in a contaminated liquid exceeds approximately three to five per cent, the rotary vacuum system has heretofore been the only system which has been somewhat commercially successful.

A rotary vacuum filter utilizes a rotating drum of filter cloth which serves as the filter septum for forming or supporting a filter cake thereupon. The filter cake bearing drum is submerged approximately one-third of its surface area in the contaminated liquid and continuously rotated. The precoat or filter cake formed on the filter septum is usually three to six inches in depth and as the unclarified liquid is being passed therethrough to be discharged from the drum interior, the precoat or filter cake traps the solids material clogging the filter and precluding further filtration. Therefore, these units utilize a knife or scraper positioned adjacent the filter drum such that the knife or scraper automatically advances into contact with the filter cake and removes a given cake thickness during each and every revolution of the drum. While such a system increases utilization of the filter drum resulting in a longer filtering cycle of operation before having to have the filter cake removed, the continuous scraping and removal of the outer surface of the filter cake increases the solids contents of the contaminated liquid progressively decreasing the time period in which the contaminants will again blind or clog the filter surface.

Another problem associated with the rotary vacuum filters is that as the clarified liquid is drawn through the filter cake into the interior of the drum through the submerged portion and air is drawn through the filter cake through the exposed portion, the air-exposed filter cake will crack or shrink due to the air passing therethrough resulting in poor filtration when the cracked filter cake is submerged in the contaminated liquid during rotation of the drum. The cracks in the filter cake will allow the unclarified liquid to pass through the filter contaminating the clarified filtrate.

Since the utilization of the prior art filtering device as described above involves either an incomplete and unsatisfactory filtering of the influent or requires costly expenditures both as to the equipment and materials utilized, none of these devices are completely satisfactory for general use in handling variable influents.

SUMMARY OF THE INVENTION

It is, therefore, an object of this invention to improve solid/liquid separation systems.

Another object of this invention is to provide a uniform effluent from an influent having variable solids concentration.

A further object of this invention is to regulate the solids content of the influent to the filtration system by selectively discharging the filtrate into a reservoir containing the influent.

Yet another object of this invention is to provide a uniform effluent from a varying quantity of influent discharge thereinto.

Still another object of this invention is to provide unattended treatment of variable quantities of influent having varying percentages of solids contained therein to provide a clarified discharge of the liquid and a dry waste disposal of the solids and/or contaminants contained therein.

These and other objects are attained in accordance with the present invention wherein there is provided a method of clarifying contaminated liquid through the use of a storage reservoir for containing high volume surges of contaminated influent and chemically treating the influent passed thereinto and a dilution reservoir for selectively transferring the contents of the storage reservoir thereinto to more uniformly control the solids content of the influent to be transferred to the filtration system. The filtration system includes a primary and secondary filter which clarify the contaminated liquid.

Upon the expension of the primary filter media, the expended filter media is removed from the primary filter and collected onto a secondary filter with the liquid being recirculated from the secondary filter through a precoat mixing chamber whererat new filter forming media are added to facilitate filtration through the secondary filter by forming a filter cake on the septum thereof from the expended filter media materials, contaminants and new filter forming media. The liquid containing these materials is recirculated through the secondary filter and precoat chamber until all of the materials have been accumulated on the secondary filter clarifying the liquid.

When all of the expended filter media has been removed from the primary filter and collected onto the secondary filter, circulation to the secondary filter is interrupted and the contents of the primary filter chamber and the precoat chamber are recirculated. A quantity of filter forming media is dispensed into the clarified liquid contained in the precoat chamber forming a slurry. The slurry is recirculated through the precoat mixing chamber and the primary filter chamber until all of the filter forming media has been accumulated on the primary filter thereby recoating the filter for further operation.

When the new filter cake has been formed on the filter elements of the primary filter unclarified liquid is discharged from the dilution reservoir into the primary filter chamber passing through the filter elements thereof and being clarified thereby. The clarified liquid from the primary filter may be passed back into the dilution dilution reservoir to control the solids concentration of the influent pumped to the filtration system, may be discharged from the system for disposal or may be returned to the source of influent depending upon the particular system application and its phase cycle of operation.

While the primary filter is on line performing its filtering function, the materials collected on the filter elements of the secondary filter are removed therefrom to gravitationally settle to the bottom of the secondary filter chamber whereat they are conveyed to a vertical heated auger which elevates and dries the solids material until it is discharged as a dry or substantially dry waste material.

DESCRIPTION OF THE DRAWINGS

Further objects of this invention, together with additional features contributing thereto and advantages accuring therefrom, will be apparent from the following description of one embodiment of the invention when read in conjunction with the accompanying drawings, wherein:

FIG. 2 is a frontal perspective view of the primary filter chamber;

FIG. 3 is a frontal perspective view of the secondary filter chamber including the means for disposing of the collected contaminants;

FIG. 4 is a secondary view of the filter mechanism utilized in the primary filter chamber;

FIG. 5 is an end view of the filters shown in FIG. 4 to better illustrate the means for removing the expended filter cake and the means for withdrawing clarified fluid from the filter chamber;

FIG. 6 is a sectional view of the filter mechanism in the secondary or desludger filter chamber;

FIG. 7 is an end view of the filters shown in FIG. 6 to better illustrate the means for removing the accumulated sludge and other materials from the filter mechanism;

FIG. 8 is a partial rear elevation of the filter outlet and piping of the primary filter apparatus; and FIG. 9 is a partial rear elevation of the filter outlet and piping of the desludger or secondary filter apparatus.

DESCRIPTION OF A PREFERRED EMBODIMENT

Figure 1:
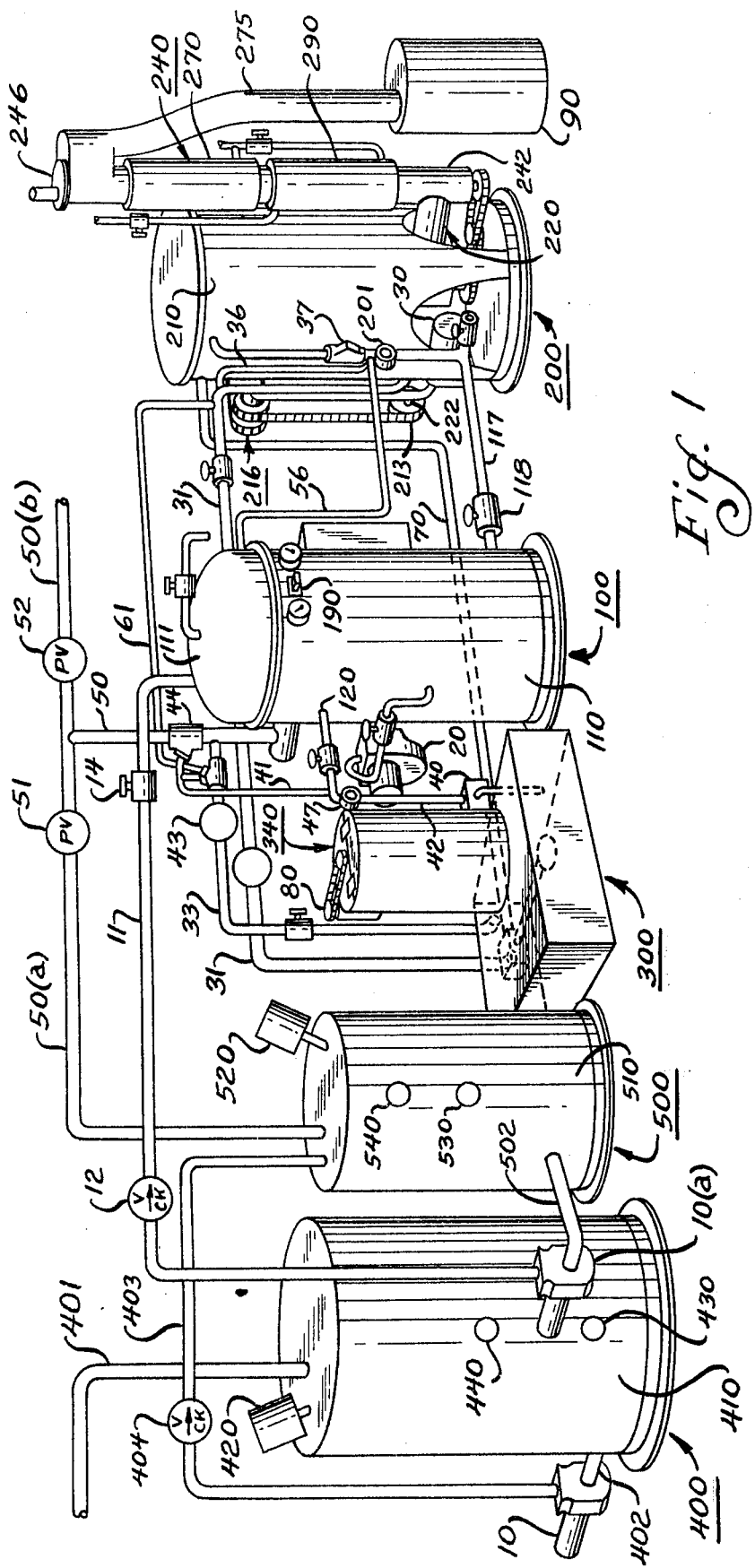
FIG. 1 is a perspective view of the invention to better illustrate the components of the system.

Referring now to FIG. 1, the liquid clarification system includes a primary filtering mechanism 100, a secondary filtering mechanism or desludger 200, a precoat apparatus 300, a storage reservoir system 400 and a dilution reservoir system 500. As best shown in FIG. 1, unclarified liquid, which may vary either as to quantity of influent and/or percentage of solids concentration in the liquid, is discharged into the storage reservior 410 through inlet line 401 which is suitably connected to the source of influent at the input and is positioned to discharge the influent into the storage reservoir chamber 410. The storage reservoir 410 is formed as a closed chamber, but may be open or closed depending upon the system application and the type of influent which might form odors when the material is discharged into the storage reservoir chamber 410. A stirring apparatus 420 is carried by the storage reservoir chamber 410 with the rotatable shaft thereof extending into the chamber a sufficient length such that the agitator is positioned at a point beneath the lowermost level controller 430 which functions in a manner to be hereinafter described in detail. Upper and lower level sensors or controllers 440 and 430, respectively, are supported from the storage reservoir chamber 410 with the sensing portion thereof extending within the chamber to control the fluid flow in a manner which will be hereinafter described in detail.

Upon actuation, a pump 10, which may be of any suitable commercially available type, withdraws the contents of the storage reservoir chamber 410 through the discharge pipe 402 and pumps the contents through line 403 into the dilution reservoir chamber 510. A suitable check valve 404 is positioned within line 403 to limit flow from the storage reservoir chamber 410 into the dilution reservoir chamber 510 thereby preventing any reverse flow through this line.

The dilution reservoir apparatus 500 includes the dilution reservoir chamber 510 which may be formed as an open or closed chamber again, depending upon the type of fluid or liquid which is conveyed into the chamber. Upper and lower controllers 540 and 530, respectively, are carried by the dilution reservoir chamber 510 and function in a manner to be hereinafter described in detail. A mixer 520, which is of the type similar to the mixer 420 previously described, is carried by the dilution reservoir chamber 510 with the rotatable shaft extending into the tank such that the agitator thereof is positioned beneath the lower level control 530.

A pump 10(a), which may be of any suitable commercially available type, is positioned to withdraw the contents of the dilution reservoir chamber 510 through the discharge outlet line 502 into the pump to be pumped through line 11 into the primary filter apparatus 100. A check valve 12 is positioned in line 11 to limit the flow of the fluid into the primary filter chamber 110 and to prevent any reverse flow.

The storage reservoir chamber 410 provides for liquid storage and allows surges of high volume influent to be stored and chemically treated as desired. The dilution reservoir chamber 510 provides for clarified liquid storage and dilution of the unclarified liquid prior to passing through the primary filtration system 100 to insure a more uniform and predetermined percentage of solids concentration.

The unclarified liquid discharged from the dilution reservoir chamber 510 into the primary filter apparatus 100 through line 11 is clarified by means of a filter system 150 and passes out from the filter chamber 110 through the filter outlet 50 to be passed through lines 50(a) or 50(b) depending upon the operation of the level controllers 540 and 530 of the dilution reservoir chamber 510. The level controllers 540 and 530 are operatively connected to the pneumatically or electrically controlled valves 51 and 52 which are carried in lines 50(a) and 50(b) respectively. The filter mechanism or system 150 of the primary filter apparatus 100 includes a hollow filter tube 162 supporting a plurality of filter elements 160 such that the unclarified liquid passing into the primary filter chamber 110 passes through the filter elements 160 into the interior of the hollow filter tube 162 for discharge.

As the unclarified liquid is passed through the filter elements 160, the contaminants, suspended solids and/or dissolved chemicals, are accumulated on the filter cake of the filter elements 160 until such time as the filter cake bearing the entrapped contaminants must be removed and replenished or replaced for efficient operation.

When this event occurs, valve 45 is closed prohibiting any influent from being passed into the filter chamber 110. Valve 44 is closed to prevent the unclarified liquid from passing through the outlet line 50 into either of lines 50(a) or 50(b). The pump 10(a) and filter pump 20 are de-energized and the desludger pump 30 and the feeder pump 40 are energized. As previously stated these pumps may be of any suitable commercially available type rated to deliver the quantities of fluid desired.

Activation of the desludger pump 30 withdraws the contents of the filter chamber 110 into the desludger apparatus 200 and the operation of the feeder pump 40 pumps the contents of the precoat chamber 310 into the primary filter chamber 110. Termination of operation of the pumps 10(a) and 20 and the energization 30 and 40 controls the opening and closing of valves, whether pneumatically or electrically operated in the appropriate lines coupling these units such that a path of fluid flow is established from the output of the desludger or secondary filter chamber 210 to the precoat chamber 310 and back into the primary filter chamber 110 and into the desludger chamber 210. While the liquid is passing in this fluid circuit, a quantity of filter cake forming material is dispensed into the precoat chamber 310 by means of the dispensing apparatus 340. This filter cake forming material along with the expended filter cake removed from the filter elements 160 of the primary filter along with the contaminants contained within the liquid are circulated in this fluid circuit until all of these materials have accumulated on the filter elements 260 carried within the desludger chamber 210.

As these materials pass through the filter elements 260, they are accumulated thereon and the liquid is discharged through line 70 to be returned to the precoat chamber 310. After all of the material has been accumulated on the filter elements 260, the liquid has been clarified and the filter pump 20 and feeder pump 40 are energized, and the desludger pump 30 and feeder pump 40 are de-energized, closing off the valving in the flow lines such that liquid is no longer discharged into or out from the desludger 200. A closed loop fluid circuit is formed between the precoat apparatus 300 and the primary filter 100.

Another quantity of filter cake forming material is dispensed into the precoat chamber 310 by means of the dispenser 340 forming a slurry therein. The slurry is then circulated through the precoat chamber 310 into the primary filter chamber 110 through the filter elements 160 forming a new filter cake thereupon. When the filter cake forming materials have been accumulated on the filter elements 160, the primary filter 100 is in condition for further filtration. The feeder pump 40 is de-energized while the filter pump 20 remains energized. The pump 10(a) is again energized passing unclarified liquid into the primary filter chamber 110 for clarification.

Through the energization and de-energization of the various pumps, the valves in the lines are opened or closed to establish a fluid circuit flowing from the dilution reservoir chamber 510 into the primary filter chamber 110 through the filter elements 160 and out the discharge outlet 50. The operation of the valves 51 and 52 remains at all times under control of the level controllers 530 and 540 of the dilution reservoir apparatus.

When the filtration system is again clarifying the liquid being pumped by pump 10(a) into the inlet of the primary filter chamber 110 and out through the filter outlet 50, the secondary filter or desludger 200 automatically cleans the materials collected on the filter elements 260 from these elements and expels these materials or sludge for disposal.

For further details of the structure and function of the primary filtration system 100, the secondary filtering system or desludger 200, and the precoat apparatus 300 refernce is had to U.S. Pat. No. 3,705,648 and U.S. Pat. No. 3,705,649 issued Dec. 12, 1972 in the name of Kostas Savas Arvanitakis whose disclosure is specifically incorporated herein by reference thereto.

In operation, the influent passing through line 401 into the storage reservoir chamber 410 may be diluted as much as 10 to 25 times in the dilution reservoir chamber 510 prior to passing to the primary filter system 100 for clarification. The flow rate or pump discharge ratio between pumps 10 and series pumps 10(a) and 20 in order to obtain even flow from the influent passing into the storage reservoir chamber 410, to the dilution reservoir chamber 510, for discharge into the primary filter system 100 is the ratio of the concentration of solids in the influent from line 401 to the concentration of solids in the liquid to be passed from the dilution reservoir chamber 510 into the primary filter apparatus 100. Thus, if the concentration of solids in the influent is 25% and the percentage of solids concentration to be discharged into the primary filter 100 is to be 2%, the pump ratio or discharge ratio between the pump 10 and the pumps 10(a) and 20 must be a minimum of the input concentration 25% divided by the desired concentration .02% or 12 ½ to 1.

A lesser pump ratio will cause the solids concentration to build up in the dilution reservoir chamber 510 since the solids entering the system, or being discharged from the storage reservoir chamber 410 into the dilution reservoir chamber 510, will be at a greater rate than the rate at which the solids are removed by the primary filter apparatus 100 for clarification of the liquid. An increase or build up of the solids concentration can be corrected by temporarily terminating the discharge of influent from line 401 or by interrupting the operation of the pump 10 which transfers the influent into the dilution reservoir chamber 510 until such time as the contents of the dilution reservoir chamber 510 have reached the desired percentage of solids concentration. However, such a solution reduces the time in which the entire system is on line and is, therefore, undesirable.

The greater pumping rate or quantity of discharge from the pumps 10(a) and 20, which as previously stated, operate in tandem or series, allows the liquid having a lower percentage of solids concentration to be pumped from the dilution reservoir chamber 510 through line 11 into the primary filter apparatus 100 to slowly accumulate the contaminants therefrom on the filter cake of the filter elements 160 achieving longer and more economical filtration cycles. This increased discharge rate of the tandem operated pumps 10(a) and 20 eliminates any heavy concentration of contaminants from entering the primary filtration system 100 where they would clog the filter cake of the filter elements 160. The lower solids concentration passing from the dilution reservoir chamber 510 into the primary filter system 100 allows a better and more uniform particle size accumulation on the filter cake of the filter elements resulting in a longer filtration cycle.

During operation, the liquids contained in both the storage reservoir chamber 410 and the dilution reservoir chamber 510 are continuously agitated by means of the stirring apparatus 420 and 520 carried by the respective chambers. The stirrers 420 and 520 allow complete and uniform suspension of all solids suspended within the liquids contained within the chambers. Chemicals may be introduced into the storage reservoir chamber 410 as by means of a dispenser, not shown, of a type similar to dispenser 340 supported on the precoat chamber 310. These chemicals may effect coagulation, flocculation and/or adjustment of the Ph of the liquids.

When the primary filter 100 is in operation clarifying the liquids passed thereinto, the transfer pump 10 is activated pumping a specific amount of contaminated liquid through line 403 into the dilution reservoir chamber 510 at a predetermined discharge rate. When the contents of the dilution reservoir chamber 510 are at the low liquid level, as determined by the level sensor or controller 530, the filter pumps 10(a) and 20, which operate in tandem, pump the liquid from the dilution reservoir chamber 510 through line 11 into the primary filter apparatus 100. Since the contents of the dilution reservoir chamber are initially at the low level, as determined by the low level sensor or controller 530, valve 52 will be closed and valve 51 will be open such that the clarified liquid discharged through the outlet line 50 of the primary filter chamber will be recycled through line 50(a) back into the dilution reservoir chamber 510. The discharge of the clarified liquid into the dilution reservoir chamber 510 will effect the desired dilution of the solids concentration of the liquid which is contained within the storage reservoir chamber 410 and delivered into the dilution reservoir chamber 510.

When the liquid level in the dilution reservoir chamber 510 rises to the level of the high level sensor or controller 540, valve number 52 in line 50(b) is opened and valve 51 in line 50(a) is closed so that the clarified liquid discharged from the primary filter apparatus 100 through outlet line 50 will pass out of the system for discharge or reuse. Since the filter pumps 10(a) and 20 are pumping the liquid through the primary filter system 100 at a much greater rate than the liquid is being transferred from the storage reservoir chamber 410 into the dilution reservoir chamber 510, the liquid level in the dilution reservoir chamber 510 will lower until such time as it reaches the low level sensor or controller 530 of the dilution reservoir chamber 510. At such time, valve 52 will close and valve 51 will open so that the clarified liquid passing from the primary filter system 100 through discharge line 50 will again be discharged through line 50 (a) back into the dilution reservoir chamber 510 to dilute the concentration of solids passing into the dilution reservoir chamber from the storage reservoir chamber 410. As the liquid level rises within the dilution reservoir chamber 510, the level reaches the upper level sensor or controller 540 and the valve sequence will be reversed, as previously discussed, and the clarified liquid discharged from the system.

The filtration system provides a wide range of control over the frequency with which the clarified liquid is discharged from the system by merely adjusting the separation of the upper and lower level sensors or controllers 540 and 530, respectively, of the dilution reservoir chamber 510. The time period between the end of the discharge of clarified liquid from the system through line 50(b) and the beginning of the next discharge of clarified liquid from the system through line 50(b) referred to as the "recirculation period" is determined by a time period equal to the differential between the quantity of liquid contained in the dilution reservoir chamber 510 when at the upper level controller level 540 and that contained in the dilution reservoir chamber when at the lower level or sensor 530 divided by the low rate of the transfer pump 10 minus the flow rate of the filter pumps 10(a) and 20 times the proportion of solids in the dilution tank 510 and may be better understood by reference to the following formula:

$$\frac{V_1}{c - ab}$$

Where
- $a$ = flow rate of pump 10($a$) plus pump 20 in gallons per minute.
- $B$ = the proportion of solids to liquid concentration in the dilution reservoir chamber 510.
- $c$ = the flow or discharge rate of the transfer pump in gallons per minute.
- $V_1$ = the difference in volume between the upper level controller 540 and the lower level controller 530 of the dilution reservoir 510 in gallons.
- $T$ = the time of the recirculation period in minutes.

The time period between the beginning of the discharge of clarified liquid from the system through line 50($b$) and the end of the discharge of the liquid from the system through line 50($b$) is defined as the "discharge period" and is determined by the formula:

$$T_2 = \frac{V_1}{a - c}$$

Where:

$V_1$, $a$, and $c$ are as defined above and $T_2$ equals the time of the discharge cycle or period expressed in minutes.

The rate of discharge of the clarified liquid from the system in gallons per minute is equal to the following formula:

$$R = a - aB$$

Where:

$a$ and $b$ are as previously defined and R is equal to the rate of discharge of the clarified liquids in gallons per minute.

The clarified liquid discharged from line 50($b$) will be equal to the amount of influent passed into the system through line 401 minus that proportion, by volume, which is suspended solid material, disregarding that small portion which may pass out of the system along with the solids materials from the desludger or secondary filtration system 200.

After the system has been on line for a specific length of time, the filter cake of the primary filter system 100 will become contaminated with the materials removed from the liquid and must be replenished. The primary filter system will then go through a sludge transfer phase which is described in detail in U.S. Pat. No. 3,705,648 previously incorporated herein by reference. When the primary filter system 100 goes through the sludge transfer phase, the filter pumps 10($a$) and 20 and the transfer pump 10 are de-activated, but the influent from line 401 continuously flows into the storage reservoir chamber 410. The storage reservoir chamber is of a size sufficient to hold the surges of liquid during the time period in which the filtration primary filter apparatus 100 is off line so that the influent to the system does not have to be interrupted during the sludge transfer or precoat phase of the primary filter system 100 operation. When the expended filter cake bearing the accumulated contaminants thereon has been removed from the filter elements 160 of the primary filter apparatus 100 and the contents thereof transferred to the secondary filter apparatus or desludger 200 and a new filter cake formed on the elements 160 of the filter apparatus 100, the filer pumps 10($a$) and 20 and the transfer pump 10 are activated and the influent is passed into the primary filter apparatus 100 to continue to operate in the manner as previously described in detail.

When the source of the unclarified or contaminated liquid passing into the storage reservoir chamber 410 is interrupted, the level of the liquid contained within the storage reservoir chamber drops to a level determined by the sensing element of the lower level sensor or controller 430 carried by the storage reservoir chamber 410. When the level has dropped to this level, the filter pump 10($a$) and 20 and the transfer pump 10 are deactivated and the primary filtration system 100 goes through the sludge transfer sequence removing all of the filter cake from the elements 160 and transferring the contents of the primary fitler apparatus into the secondary filter or desludger 200 clarifying the liquid contained within the primary filter apparatus 100 and accumulating all of the contaminants on the filter elements 260 of the secondary filter or desludger 200 in the manner described in the aforementioned patent. Upon completion of the sludge transfer cycle, the entire system will stop.

When the influent or unclarified liquid is again passed through inlet 401 into the storage reservoir chamber 410, the liquid level therein will increase until such time as it reaches the level of the high liquid level sensor or controller 440 which will initiate the precoat phase of the filtration system operation which is discussed in detail in U.S. Pat. No. 3,705,648. After a new filter cake has been formed on the filter elements 160, filter pumps 10($a$) and 20 will be energized as well as transfer pump 10 to pass the contaminated liquid from the storage reservoir chamber 410 into the dilution reservoir chamber 510 for processing through the primary filter apparatus 100.

While the invention has been described with reference to a preferred embodiment, it will be understood by those skilled in the art that various chambers may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

I claim:

1. A method of liquid solid separation providing a controlled percentage of solids material contained in the unclarified liquid being separated comprising the steps of discharging a contaminated liquid having a first percentage of solids materials therein into a first storage means for containing the liquid, transferring a portion of the liquid from the first storage means into a second storage means controlling liquid having a second percentage of solids materials therein less than the percentage of solids material in the liquid contained in the first storage means at a transfer rate responsive to the differential between said first and said second percentage of solids material contained in the liquid, transferring a quantity of the liquid from the second storage means into filtration means for clarifying the liquid by removing the solids materials therefrom at a predetermined transfer rate responsive to said second percentage of solids material contained in the liquid transferred to the filtration means, clarifying the liquid transferred into the filtration means by removing the solids materials and discharging the clarified liquid therefrom, selectively transferring the clarified liquid discharged from the filtration means to the second storage means containing liquid having a second percentage of solids materials therein less than the first percentage of solids materials in the liquid contained in the first storage means in response to the percentage of solids materials in the liquid contained in the second storage means.

2. The method of claim 1 wherein the step of clarifying the liquid transferred into the filtration means and discharging the clarified liquid therefrom includes passing the unclarified liquid through a primary filter removing the solids materials therefrom and discharging the liquid clarified thereby, interrupting the discharging of the clarified liquid in response to the accumulation of a predetermined amount of solids materials on the primary filter, removing the accumulated materials from the primary filter into the unclarified liquid, passing the unclarified liquid bearing the accumulated materials through a secondary filter to accumulate the solids materials thereon and discharging the liquid clarified thereby into a chamber, interrupting the passing of liquid through the secondary filter upon the accumulation of the solids materials thereon, adding a quantity of filter forming material to the clarified liquid passed into the chamber and circulating the filter material bearing liquid through the primary filter to renew the filtering elements thereof.

removing the accumulated solids materials from the secondary filter, and conveying said materials from the secondary filter to an auger means in communication with the secondary filter means, forming at least one plug of the solids materials within said auger means, heating said materials in said auger means to vaporize at least a portion of the liquid therein, the portion of liquid remaining in said solids materials being sufficiently small so that the materials can be conveyed by the auger means at relatively slow speeds of rotation of said auger means, and discharging substantially dry solids materials at an open end of the auger means.

3. The method of claim 1 wherein the step of transferring a quantity of the liquid from the second storage means into the filtration means for clarifying the liquid by removing the solids materials therefrom is effected at a greater transfer rate than the step of transferring a portion of the liquid from the first storage means into the second storage means.

4. The method of claim 3 wherein the differential between the transfer rates is determined in response to the differential in the percentage of solids materials contained in the first and second storage means.

5. The method of claim 1 wherein the step of selectively transferring the clarified liquid discharged from the filtration means to the second storage means in response to the percentage of solids material in the liquid contained in the second storage means includes sensing a first quantity of liquid in the second storage means containing liquid having a second percentage of solids materials therein and in response thereto discharging the clarified liquid into the second storage means until a second quantity of liquid is contained therein having a percentage of solids material therein less than said second percentage of solids material, sensing the second quantity of liquid in the second storage means and in response thereto interrupting the discharge of clarified fluid thereinto, and resuming the transferring of clarified liquid discharged from the filtration means to the second means upon the sensing of the first quantity of liquid being contained therein.

6. The method of claim 5 further including discharging the clarified liquid from the filtration means for disposal or reuse upon the sensing of the second quantity of liquid in the second storage means.

7. The method of claim 1 further including interrupting the transfer of liquid from the first storage means into the second storage means and the transfer of liquid from the second storage means into the filtration means upon the accumulation of a predetermined guantity of solids material from the liquid by the filtration means.

8. The method of claim 7 further including removing the solids material accumulated by the filtration means from said filtration means, replenishing said filtration means for the further accumulation of solids material, and resuming transferring of the liquid from the first storage means into the second storage means into the filtration means upon replenishing said filtration means for the further accumulation of solids material.

* * * * *

UNITED STATES PATENT OFFICE
CERTIFICATE OF CORRECTION

Patent No. 4,001,115         Dated January 4, 1977

Inventor(s) Kostas S. Arvanitakis

It is certified that error appears in the above-identified patent and that said Letters Patent are hereby corrected as shown below:

Column 10, line 64, "controlling" should read --- containing ---.

Column 12, line 31, after "second" insert --- storage ---.

Column 12, line 50, after "means" second occurrence, insert --- and the transferring of liquid from the second storage means ---.

Signed and Sealed this

Twenty-fourth Day of May 1977

[SEAL]

Attest:

RUTH C. MASON
*Attesting Officer*

C. MARSHALL DANN
*Commissioner of Patents and Trademarks*